Patented Aug. 26, 1924.

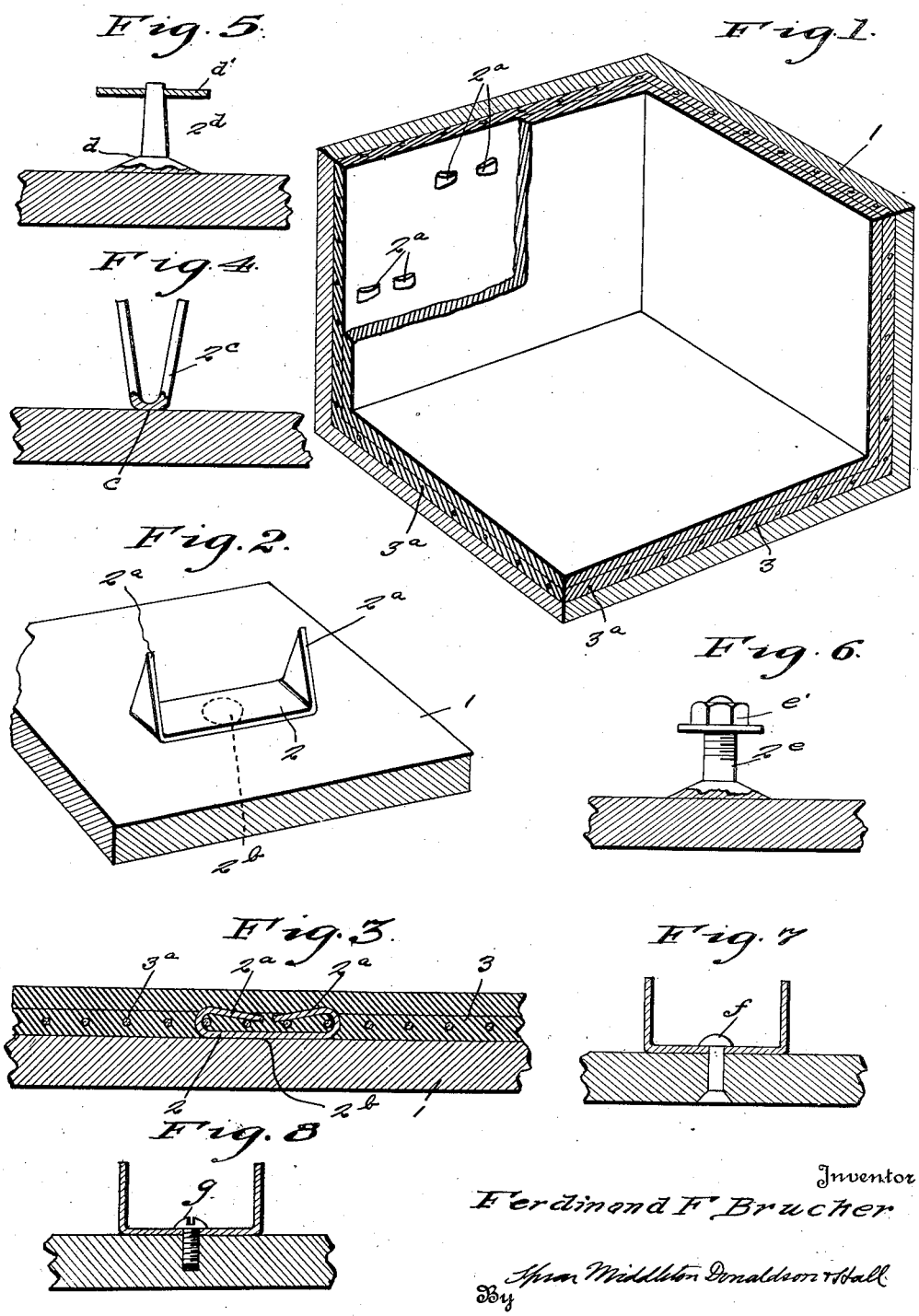

1,506,288

UNITED STATES PATENT OFFICE.

FERDINAND F. BRUCKER, OF AKRON, OHIO, ASSIGNOR TO THE MILLER RUBBER COMPANY, OF AKRON, OHIO, A CORPORATION OF OHIO.

ACID-PROOF TANK OR CONTAINER.

Application filed December 19, 1923. Serial No. 681,578.

*To all whom it may concern:*

Be it known that I, FERDINAND F. BRUCKER, a citizen of the United States, and resident of Akron, in the county of Summit and State of Ohio, have invented certain new and useful Improvements in Acid-Proof Tanks or Containers, of which the following is a specification.

My present invention relates to improvements in acid-proof tanks designed to hold or transport relatively large quantities of acid material, and aims to provide a lined tank or container adapted for this purpose, which may be produced at a minimum cost, will be strong and durable in use, having a lining which will not become cracked or separated from the metal walls of the tank, and which will fulfill in every way the requirements of the Interstate Commerce Commission.

With these and other objects in view, the invention includes the novel features of construction and arrangement and combination of parts hereinafter described, and particularly defined in the appended claims.

My invention is illustrated in the accompanying drawing, in which:—

Figure 1 is a view of a tank partly broken away.

Fig. 2 is an enlarged detail view showing one of the anchor devices prior to application of the fabric-reinforced layer.

Fig. 3 is an enlarged section detail showing the fabric-reinforced sheet in position.

Figs. 4, 5 and 6 are detail views showing modified forms of fastening means, and Figs. 7 and 8 are similar views of further modifications.

Referring by reference characters to this drawing, the numeral 1 indicates the metal tank, to which my improved lining is applied, and which may be of the ordinary or any desired form, size, and construction.

I use for the acid-proof lining material, vulcanizable rubber compounds. Great difficulty has heretofore been experienced in securing rubber to metal surfaces in an effective and permanent manner, especially when such surfaces are smooth and of considerable area, such as tank walls.

This difficulty I overcome in the following manner. To the inner walls (including top, bottom and sides) I secure by welding (such as arc welding) brazing or soldering, a plurality of properly spaced fastening or anchoring devices, such for example as the sheet metal staples 2 having upstanding portions or projections $2^a$, the base of the staple being welded to the tank surface at the point $2^b$.

Thereafter I apply to the metal surface a sheet of rubber compound having a fabric or reticulated material embedded therein, such sheet being indicated as a whole at 3, and the reinforcing reticulated material at $3^a$. For the reinforcing material I preferably employ a woven wire fabric, though it will be obvious that any reticulated material may be used having openings through which the rubber may pass and form a firm bond or union between the two surface layers. Such wire fabric may be conveniently coated by laying on, or applying to, each side thereof a sheet of rubber compound and passing the composite sheet through a calender which causes the two sheets of rubber to be pressed firmly against the fabric and united to each other through the openings or reticulations.

This composite or laminated sheet is then applied to the tank wall and pressed thereagainst to cause the prongs of the anchoring or fastening devices to penetrate the sheet, after which they are clenched over as shown in Fig. 3.

A protective sheet is then placed over the foundation or anchoring sheet and pressed firmly into contact therewith. The operation having been repeated for all of the walls to be covered, and the edges of the sheets at the corners having been pressed into intimate contact, the tank is then subjected to the proper vulcanizing temperature to cure the foundation and overlying layers into an homogeneous lining which, as will be readily seen, is firmly and permanently bound to the metal walls of the tank.

Preferably I embody in the rubber compounds, an accelerator which will enable the curing to be effected at a relatively low temperature, and accomplish such cure by filling the tank with water heated to required temperature.

Instead of using a sheet metal staple such as shown in Fig. 2, I may use a wire staple as shown at $2^c$, Fig. 4, welded or otherwise fastened at $c$ to the tank wall; or I may use a rivet $2^d$ (Fig. 5) having its head $d$ secured to the tank wall and having a washer $d'$ designed to be secured by upsetting the outer end of the rivet. Again, in place of a washer, I may, if conditions render it more desirable, use a screw bolt $2^e$ having its head welded or brazed to the tank wall (see Fig. 6) and having a nut $e'$ threaded on the upper end thereof.

Obviously the foundation and overlying sheets may, either or both, be of material which will vulcanize to any degree of hardness required by the conditions of use, or as deemed most desirable.

In some cases it may not be necessary to weld or braze the anchoring devices to the tank, and in this event it might be found more desirable to use some other type of fastening means such as riveting, as shown at $f$ in Fig. 7, or a screw $g$ tapped into the container wall, as shown in Fig. 8.

Having thus described my invention, what I claim is:—

1. An acid-proof tank comprising a metal body having anchoring devices secured to the walls thereof, a foundation layer of rubber compound having a sheet of reticulated material incorporated therewith, which sheet is engaged by said anchoring devices, and a protecting sheet of rubber compound overlying said foundation layer and united thereto by vulcanization.

2. A metal tank having a wall with anchoring devices secured thereto, a foundation sheet having a reticulated reinforcement therein, engaged by said anchoring devices, and a protective sheet overlying said foundation sheet, said sheets being of vulcanizable material united by the vulcanization.

3. In combination, a metal tank, staples having their heads secured thereto, a foundation sheet of rubber compound reinforced by reticulated material, said staples being passed through said reticulated material, and overturned or clenched thereon, and a protective sheet of rubber compound overlying said foundation sheet and vulcanized thereto.

4. An acid-proof tank comprising a metal body having anchoring devices homogeneously united to the inner walls thereof, a foundation layer of rubber compound having a sheet of reticulated material incorporated therewith, which sheet is engaged by said anchoring devices, and a protecting sheet of rubber compound overlying said foundation layer and united thereto by vulcanization.

5. An acid tank comprising a metal body having anchoring devices secured to the inner faces of the walls thereof, and a foundation sheet of vulcanizable material secured to said walls by said anchoring devices and a protective sheet of vulcanizable material overlying said foundation sheet and vulcanized thereto.

In testimony whereof I affix my signature.

FERDINAND F. BRUCKER.